United States Patent [19] [11] 4,098,572
Smith [45] Jul. 4, 1978

[54] CURABLE POLYSILOXANE AQUEOUS EMULSION WITH Na OR Mg SULFATE, AND TREATING OF KERATINOUS FIBRES

[75] Inventor: Charles Smith, South Glamorgan, Wales

[73] Assignee: Dow Corning Limited, Barry Glamorgan, Wales

[21] Appl. No.: 801,192

[22] Filed: May 27, 1977

[30] Foreign Application Priority Data

Jun. 11, 1976 [GB] United Kingdom ............... 24214/76

[51] Int. Cl.$^2$ ...................... D06M 15/66; C08L 83/08
[52] U.S. Cl. ................................. 8/128 A; 8/DIG. 1; 260/29.2 M; 260/825; 427/387; 428/447
[58] Field of Search ................. 260/29.2 M; 8/128 A, 8/DIG. 1

[56] References Cited

U.S. PATENT DOCUMENTS

| | | | |
|---|---|---|---|
| 2,588,365 | 3/1952 | Dennett | 8/DIG. 1 |
| 2,789,956 | 4/1957 | Eder | 260/29.2 M |
| 2,807,601 | 9/1957 | Dennett | 260/29.2 M |
| 3,061,567 | 10/1962 | Keil | 260/29.2 M |
| 3,098,833 | 7/1963 | Solomon | 260/29.2 M |
| 3,127,363 | 3/1964 | Nitzsche et al. | 260/29.2 M |
| 3,814,710 | 6/1974 | Duncan | 260/825 |
| 3,849,359 | 11/1974 | Nitzsche et al. | 260/825 |

*Primary Examiner*—Murray Tillman
*Assistant Examiner*—A. H. Koeckert
*Attorney, Agent, or Firm*—Robert F. Fleming, Jr.

[57] ABSTRACT

An aqueous siloxane-in-water emulsion containing (A) a polydiorganosiloxane having terminal —OX radicals in which X is hydrogen, alkyl or alkoxyalkyl, and at least two amino-containing substituents per molecule, (B) a siloxane containing silicon-hydrogen groups, (C) one or more nonionic and/or cationic emulsifying agents and (D) magnesium sulphate or sodium sulphate. The compositions can be applied to keratinous fibres by an exhaustion technique to render the fibres resistant to shrinkage during laundering.

9 Claims, No Drawings

CURABLE POLYSILOXANE AQUEOUS EMULSION WITH Na OR Mg SULFATE, AND TREATING OF KERATINOUS FIBRES

This invention relates to a composition and process for the treatment of keratinous fibres and is concerned with an improvement in or modification of the invention claimed in application Ser. No. 684,201.

In our application Ser. No. 684,201 there are described and claimed a composition and process for the treatment of keratinous fibres to render such fibres resistant to shrinkage. Briefly described the composition of said application comprises (A) a polydiorganosiloxane having terminal silicon-bonded hydroxy, alkoxy or alkoxyalkoxy radicals and substituents containing amine groups, and (B) an organosiloxane having at least three silicon-bonded hydrogen atoms. Said composition may be applied to keratinous fibres employing an organic solvent carrier but is particularly adapted for application in the form of an aqueous emulsion. Application of such aqueous emulsions to the fibres may be carried out by any suitable technique, for example padding or spraying.

Certain of these aqueous compositions are to some extent substantive to keratinous fibres, that is the siloxane becomes selectively deposited on the fibres during immersion of the fibres in the aqueous emulsion. Such a property is of particular interest with respect to the batch treatment of pieces of fabric or finished goods such as sweaters and hosiery. When keratinous goods are to be treated by a batch process, a preferred arrangement would be one in which substantially all of the siloxane in the aqueous treating composition becomes deposited on the goods during immersion. The treated goods are then removed and dried to leave an aqueous residue which contains substantially no siloxane. This residue may then be discarded and the treating equipment recharged.

We have now found that aqueous compositions of the type described in application Ser. No. 684,201 can be made highly substantive to keratinous fibres if certain conditions relating to the nature of the compositions are fulfilled and if magnesium sulphate and/or sodium sulphate is incorporated into the compositions.

Accordingly this invention provides an aqeuous siloxane-in-water emulsion containing (A) a polydiorganosiloxane having a molecular weight of at least 2500 and terminal —OX radicals, wherein X represents a hydrogen atom, an alkyl radical having from 1 to 15 carbon atoms or alkoxyalkyl radicals having from 3 to 15 carbon atoms, at least two of the silicon-bonded substituents present in said polydiorganosiloxane being monovalent radicals composed of carbon, hydrogen, nitrogen and, optionally, oxygen, which radicals contain at least two amine groups and are attached to silicon through a silicon to carbon linkage, and at least 50 percent of the total substituents in said polydiorganosiloxane being methyl radicals, any remaining substituents being monovalent hydrocarbon radicals having from 2 to 20 inclusive carbon atoms, (B) an organosiloxane having at least three silicon-bonded hydrogen atoms in the molecule and in which the organic substituents are alkyl radicals having less than 19 carbon atoms, (C) one or more cationic and/or nonionic emulsifying agents and (D) magnesium sulphate and/or sodium sulphate.

This invention also provides a process for the treatment of keratinous fibres which comprises immersing said fibres in an aqueous emulsion of the invention, thereafter drying the fibres and curing the siloxane present thereon.

The polydiorgansiloxanes (A) employed in the compositons of this invention are linear or substantially linear siloxane polymers having a molecular weight of at least 2500 and —OX radicals attached to each terminal silicon atom, wherein X represents hydrogen or an alkyl or alkoxyalkyl radical having up to 15 carbon atoms. Examples of the operative X radicals are methyl, ethyl, propyl, hexyl and methoxyethyl. Preferably X represents the methyl radical or the ethyl radical. Up to 3 —OX radicals may be attached to each terminal silicon atom, the preferred polydiorganosiloxanes are however, those having one —OX radical attached to each terminal silicon atom. The polydiorganosiloxanes (A) can be prepared by known techniques, for example by the equilibration of the appropriate cyclic siloxanes. A more preferred method of preparing the polydiorganosiloxanes (A) comprises reacting a silanolterminated polydiorganosiloxane free of the specified amino-containing substituents with a silane $CH_3(XO)_2SiZ$ in which X is as hereinabove defined and Z represents a monovalent radical composed of carbon, hydrogen, nitrogen and, optionally, oxygen, which radical contains at least two amino groups and is attached to silicon through a carbon to silicon linkage.

At least two of the silicon-bonded substituents in (A) are the specified monovalent radicals composed of carbon, hydrogen, nitrogen and, optionally, oxygen and containing at least two amino groups. Preferably said amino-containing substituents have less than 21 carbon atoms and are joined to the silicon atom through a bridge of at least 3 carbon atoms. Any oxygen may be present in ether and/or carbonyl groups. Examples of the operative amino-containing substituents are $-(CH_2)_3NHCH_2CH_2NH_2$, $-(CH_2)_4NHCH_2CH_2NH_2$, $-CH_2CH(CH_3)CH_2NHCH_2CH_2NH_2$, $-(CH_2)_3NHCH_2CH_2NHCH_2CH_2NH_2$, $$-(CH_2)_3NHCH_2CH_2\overset{\overset{\displaystyle CH_2CH_2NH_2}{|}}{CH}(CH_2)_3NH_2 \text{ and}$$

$-(CH_2)_3NH(CH_2)_2NHCH_2CH_2COOCH_3$, the first three exemplified groups being preferred.

At least 50% of the silicon-bonded organic substituents in the polydiorganosiloxane are methyl radicals, any other radicals present in addition to said methyl radicals and the specified amino-containing substituents being monovalent hydrocarbon radicals having from 2 to 20 carbon atoms. Examples of such monovalent hydrocarbon radicals are ethyl, propyl, 2,4,4-trimethylpentyl, cyclohexyl, vinyl and phenyl. Preferably the organic radicals present in the polydiorganosiloxane in addition to the amino-containing radicals are substantially all methyl radicals.

The organosiloxanes which comprise component (B) of the compositions of this invention are, in general, well known materials. They may comprise any one or more organosiloxanes having at least three silicon-bonded hydrogen atoms in the molecule. They are preferably linear siloxane polymers but may be cyclic or branched or mixtures of all three types. The organic substituents present in the organosiloxane are preferably methyl radicals but other alkyl radicals having less than 19 carbons atoms, e.g. ethyl or 2,4,4-trimethylpentyl may also be present. The organosiloxanes (B) can be for example copolymers of dimethylbutylsiloxane units with methylhydrogensiloxane units, copolymers of dimethylhydrogensiloxane units, ethylhydrogensiloxane units and dimethylsiloxane units and copolymers of trimethylsiloxane units, dimethylsiloxane units and methylhydrogensiloxane units. Preferred as the organosiloxanes (B) are copolymers of trimethylsiloxy units and methylhydrogensiloxane units, with or without copolymeric dimethylsiloxane units.

The relative proportions of (A) and (B) employed in forming the compositions of this invention are not narrowly critical and will depend, at least partially, on the nature of (A) and (B). Generally (B) may be employed in a proportion of from about 0.8 to 50%, preferably from 1.0 to 10%, by weight based on the weight of (A) but higher or lower proportions may be more appropriate in certain cases.

The emulsifying agents (C) should be of the nonionic or cationic type. More than one type of nonionic or cationic emulsifying agent may be employed in any given emulsion and both nonionic and cationic types may be employed together. Examples of nonionic emulsifying agents are the reaction products of alcohols or phenols with ethylene oxide, such as polyethoxyethers of nonyl phenol and octyl phenol and the trimethylnonyl ethers of polyethylene glycols and monoesters of ethylene and propylene glycols such as glyceryl monostearate, sorbiton monolaurate and polyoxyethylene monostearate. The preferred non-ionic emulsifying agents are the polyethoxyethers of alcohols and phenols. The cationic emulsifying agents can be, for example, amino and ammonium compounds, preferably the ethoxylated amines such as those having the general formula

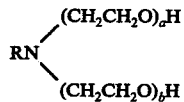

in which R is a long chain alkyl group having from about 12 to about 18 carbon atoms and the sum of $a$ and $b$ is from 2 to about 15. The emulsifying agent (C) can be employed in the normal proportions for emulsifying siloxanes. The actual amount is not critical, usually from about 1 to 20% by weight based on the weight of (A) and (B) being appropriate.

Component (D) of the compositions of this invention is magnesium sulphate and/or sodium sulphate. This component can be employed in widely varying proportions, preferably from about 10% to about 70% by weight based on the weight of polydiorganosiloxane (A).

Any suitable technique may be employed to prepare the emulsions of this invention. Most conveniently the polydiorganosiloxane (A) and the organosiloxane (B) are emulsifed separately, the resulting emulsions being mixed together, and with (D), just prior to use. If desired the stability of the mixed or the component emulsions can be increased by acidification with, for example, acetic or hydrochloric acids to a pH of about 3.

The compositions of this invention can be applied to keratinous fibres to render such fibres resistant to shrinkage on laundering and/or to impart other desirable properties e.g. to improve the softness of the fibres and their resistance to pilling. The treating liquor to goods ratio is not critical and can vary for example from 10:1 to 60:1. The siloxane concentration in the treating liquor will depend on the desired pick-up of siloxane by the fabric. A useful improvement in shrink resistance is obtained when the fibres have deposited thereon as little as about 1% by weight of siloxane. For optimum shrink-proofing properties, however, an add-on of from about 2.5 to about 6% by weight of siloxane is preferred. The preferred concentration of siloxane in the treating liquor is therefore generally from about 2.5 to 6% by weight. It is to be understood, however, that the treating process of this invention is not limited to those cases in which the siloxane in the treating liquor is completely exhausted in one operation.

Deposition of the siloxane on to the fibres is indicated by clearing of the emulsion in which the fibres are immersed and can be followed by light transmission measurements. The rate of deposition can be increased if desired by increasing the temperature of the treating liquor. Generally it is preferred to carry out the treatment at a temperature in the range from 25° to 70° C.

The rate of deposition can also be affected by the pH of the treating liquor. Very highly alkaline liquors can give rise to very rapid deposition resulting in some cases in uneven treatment of the fibres. Highly acidic liquors can retard deposition of the siloxane on the fibres. Most suitably deposition occurs in from about 10 minutes to about one hour and it is preferred to employ application conditions, including a pH of from 4.5 to 7, which give rise to such a rate of deposition.

Following immersion in the treating liquor the treated fibres are dried and the applied siloxane cured. Drying and curing may be carried out by merely exposing the treated fibres to normal atmospheric temperatures e.g. from 15° C to 30° C. If desired, however, this step may be expedited by the use of elevated temperatures, for example, from 40° to 140° C. Usually it is preferred to expose the fibres after immersion to an elevated temperature, for example from 60°- 90° C, for several minutes and thereafter to ambient temperatures for 12 to 72 hours. If desired the curing step may also be expedited by including in the treating composition a siloxane curing catalyst, for example a metal carboxylate such as dibutyltin dilaurate, dibutyltin diacetate and zinc octoate.

The process of this invention can be employed to impart shrink resistance and/or other desirable properties to a variety of keratinous fibres, for example lamb's wool, botany wool, mohair, cashmere and alpaca. The fibres may be treated in any form, for example as yarns, knitted or woven fabrics or made up garments.

For optimum shrinkproofing it is preferred that the surfaces of the fibres to be treated should be free of surface active agents. Fibres which have previously been in contact with such substances, such as during aqueous scouring, are therefore preferably treated, e.g. by rinsing in water to remove any residual surface active agent.

The following examples illustrate the invention, the parts being expressed by weight.

EXAMPLE 1.

A siloxane copolymer was prepared by heating together $CH_3(CH_3O)_2Si(CH_2)_3NHCH_2CH_2NH_2$ (7.5 parts) and a polydimethylsiloxane (1000 parts) having hydroxyl group attached to each terminal silicon atom and a viscosity of approximately 4,500 cS at 25° C. The heating step was performed under nitrogen for two hours at 150° C, the reaction mixture being efficiently stirred. The resulting copolymer product was a clear liquid having a viscosity of approximately 6,000 cS at 25° C.

The copolymer prepared as described above (33.33) parts was added to a mixture of water (63.33 parts), Ethomeen S12 (1.42 parts), Ethomeen S15 (0.24 parts) and Tergitol TMN.6 (1.67 parts) and the mixture stirred rapidly to produce a siloxane in water emulsion (Emulsion A).

Employing a similar procedure an aqueous emulsion (Emulsion B) rof a trimethylsiloxy end-stopped polymethylhydrogensiloxane (viscosity 30 cS at 25° C) (33.33 parts) was prepared with the aid of Ethomeen S12 (0.56 parts), Ethomeen S15 (0.28 parts) and Tergitol TMN.6 (1.67 parts) as emulsifying agents. The amount of water employed was 64.11 parts and the pH of the emulsion was adjusted to about 4.0 by the addition of acetic acid.

To water (360 parts) in a large beaker were added separately with stirring Emulsion A(2.7 parts) Emulsion B (0.135 parts) and magnesium sulphate (0.505 parts). The pH of the resulting liquor was adjusted to about 5.5 by the addition of acetic acid and a piece of botany wool fabric (cover factor 1.1) and dimensions 30 cm. × 40 cm. immersed in the liquor. The temperature of the liquor was raised slowly to 40° C and wool fabric agitated. In about 35 minutes the liquor had become clear indicating deposition on the fabric. The fabric was then removed, dried at 80° C for about 6 minutes and exposed to the ambient atmosphere (60% RH, 20° C) for 3 days.

The resistance of the treated sample to shrinkage was then measured according to the method of the International Wool Secretariat, Specification WSS 128, Test Method 185. Briefly stated, said test method involves subjecting samples of the fabric to laundering for periods of 1 hour or 3 hours in an International Cubex Machine. From measurements of the dimensions of the fabric prior to and following laundering the percentage area felting shrinkage (AFS) can be calculated. After a 3 hour wash period the sample exhibited a percentage AFS of 8.4.

EXAMPLE 2

The procedure described in Example 1 was repeated except that there was added to the treating liquor 0.076 parts of a 20% emulsion of dibutyltin diacetate. The AFS of the wool sample after a 3 hour wash period was 2.7%.

EXAMPLE 3

The procedure of Example 1 was used to treat two samples of knitted Shetland wool fabric, 0.6 part of magnesium sulphate and 0.033 part of Emulsion B being used. in place of the quantities specified in that Example. After removal from the treating liquor the fabric was allowed to drain, placed in an oven at 80° C for 30 minutes and then exposed to the ambient atmosphere (50% RH, 20° C) for 24 hours.

Measurement of the area felting shrinkage after 1 hour and 3 hours laundering in the Cubex machine gave the following values

|  | 1 hour | 3 hours |
|---|---|---|
| 1st sample | −0.9 | −3.4 |
| 2nd sample | +0.4 | −2.8 |

The negative values indicate elongation of the fabric.

That which is claimed is :

1. An aqueous siloxane-in-water emulsion containing (A) a polydiorganosiloxane having a molecular weight of at least 2500 and terminal —OX radicals wherein X represents a hydrogen atom, an alkyl radical having from 1 to 15 carbon atoms or an alkoxyalkyl radical having from 3 to 15 carbon atoms, at least two of the silicon-bonded substituents present in said polydiorganosiloxane being monovalent radicals composed of carbon, hydrogen, nitrogen and, optionally, oxygen, which radicals contain at least two amine groups and are attached to silicon through a silicon to carbon linkage, and at least 50 percent of the total substituents in said polydiorganosiloxane being methyl radicals, any remaining substituents being monovalent hydrocarbon radicals having from 2 to 20 inclusive carbon atoms, (B) an organosiloxane having at least three silicon-bonded hydrogen atoms in the molecule and in which the organic substituents are alkyl radicals having less than 19 carbon atoms, (C) one or more emulsifying agents selected from cationic and nonionic emulsifying agents and (D) magnesium sulphate, sodium sulphate or both.

2. An aqueous emulsion as claimed in claim 1 wherein the polydiorganosiloxane has been prepared by the reaction of a silanol-terminated polydiorganosiloxane and a silane of the general formula $CH_3(XO)_2SiZ$, wherein X represents an alkyl radical having from 1 to 15 carbon atoms or an alkoxyalkyl radical having from 3 to 15 carbon atoms and Z represents a monovalent radical composed of carbon, hydrogen, nitrogen and, optionally, oxygen, which radical contains at least two amino groups and is attached to silicon through a silicon to carbon linkage.

3. An aqueous emulsion as claimed in claim 1 wherein X represents the methyl radical or the ethyl radical.

4. An aqueous emulsion as claimed in claim 1 wherein (B) is present in a proportion of from 1 to 10% by weight based on the weight of (A).

5. A process for the treatment of keratinous fibres which comprises immersing said fibres in an aqueous emulsion as claimed in claim 1, thereafter drying the fibres and curing the siloxane present thereon.

6. A process as claimed in claim 5 wherein the polydiorganosiloxane has been prepared by the reaction of a silanol-terminated polydiorganosiloxane and a silane of the general formula $CH_3(XO)_2SiZ$, wherein X represents an alkyl radical having from 1 to 15 carbon atoms or an alkoxyalkyl radical having from 3 to 15 carbon atoms and Z represents a monovalent radical composed of carbon, hydrogen, nitrogen and, optionally, oxygen, which radical contains at least two amino groups and is attached to silicon through a silicon to carbon linkage.

7. A process as claimed in claim 6 wherein the aqueous emulsion has a pH of from 4.5 to 7.

8. A process as claimed in claim 5 wherein (B) is present in a proportion of from 1 to 10% by weight based on the weight of (A).

9. A process as claimed in claim 5 wherein the temperature of the aqueous emulsion is from 25° to 70° C.